US006620071B1

United States Patent
Cook et al.

(10) Patent No.: US 6,620,071 B1
(45) Date of Patent: Sep. 16, 2003

(54) POWER TAKEOFF UNIT WITH CENTER DIFFERENTIAL CONSTRUCTION

(75) Inventors: Dennis Cook, Royal Oak, MI (US); George Leposky, Belleville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/108,949

(22) Filed: Mar. 27, 2002

(51) Int. Cl.[7] .......................... F16H 48/04; F16H 37/08
(52) U.S. Cl. ....................................... 475/221; 475/204
(58) Field of Search ............................... 475/221, 204, 475/206; 180/248, 249

(56) References Cited

U.S. PATENT DOCUMENTS

| | | | | |
|---|---|---|---|---|
| 4,457,394 A | * | 7/1984 | Suzuki | 475/221 |
| 4,671,135 A | * | 6/1987 | Dangel | 475/221 |
| 4,700,800 A | * | 10/1987 | Friedrich et al. | 475/221 |
| 4,718,303 A | | 1/1988 | Fogelberg | |
| 4,781,078 A | | 11/1988 | Blessing et al. | |
| 4,989,686 A | | 2/1991 | Miller et al. | 180/197 |
| 5,017,183 A | | 5/1991 | Teraoka | 475/150 |
| 5,080,640 A | | 1/1992 | Botterill | 475/231 |
| 5,188,574 A | * | 2/1993 | Echigo et al. | 475/221 |
| 5,267,914 A | * | 12/1993 | Eastman et al. | 475/221 |
| 5,547,430 A | * | 8/1996 | Gasch | 475/221 |
| 5,584,776 A | | 12/1996 | Weilant et al. | 475/213 |
| 5,915,513 A | | 6/1999 | Isley, Jr. et al. | 192/35 |
| 6,513,615 B2 | * | 2/2003 | Bowen et al. | 475/221 |

* cited by examiner

Primary Examiner—Sherry Estremsky
(74) Attorney, Agent, or Firm—Brinks Hofer Gilson & Lione

(57) ABSTRACT

A power takeoff unit with torque bias capable center differential construction for four-wheel drive which includes a planetary center differential connectable to an input shaft from a transmission, the gear arrangement includes at least three nested gear components for interconnecting the input shaft with both a rear drive transfer mechanism and a planetary final drive for full-time drive such that input torque to the power takeoff unit is split between the rear drive transfer mechanism and the planetary final drive in a predetermined ratio. An electronically or mechanically actuatable friction clutch surrounds a front axle differential or can be placed between the rear drive transfer mechanism and the planetary final drive. The clutch has frictionally engageable members connected to at least one of the planetary gear components in a manner such that the torque bias to the front and rear wheel drive output shafts is controlled by a torque level established between the frictionally engagable members of the clutch.

23 Claims, 8 Drawing Sheets

POWER TAKEOFF UNIT WITH CENTER DIFFERENTIAL CONSTRUCTION

FIELD OF THE INVENTION

The present invention relates to a power transmission apparatus applicable for vehicles having a differential mechanism for dividing torque between two output shafts. In particular, the present invention relates to an apparatus provided with a power takeoff unit with torque bias capable center differential construction for controlling torque transmission between front and rear axles in a four-wheel drive vehicle.

BACKGROUND

The performance advantages of four-wheel vehicle drive systems are well-recognized. Improved vehicle stability while traversing rain-soaked or ice and snow-covered highways, handling and control on gravel or uneven pavement and simply maintaining traction in off-road situations are all readily acknowledged benefits. Concomitant though less desirable characteristics of four-wheel drive systems relate to increased vehicle weight and increased drive-line friction which result in reduced gas mileage. Such increased drive-line friction results from the increased number of driven components and is especially significant in full-time four wheel drive systems.

Four-wheel drive vehicles having a transfer case in the drive-line for distributing power to the front and rear drive axles are known in the art. In such vehicles, the transfer case is usually provided with two or more output shafts which are driven by a main or input shaft. The driven shafts may be referred to as output drive shafts since they are used to drive the vehicle road wheels through drive axles. Some differential in the speed between the shafts is necessary to permit different rotational speeds of the driving wheels to accommodate vehicle steering. As a vehicle negotiates a corner, the front wheels traverse paths of longer average radius and length than the rear wheels. Therefore, there is a need for allowing speed differences between the front and rear axles to prevent the rear wheels from spinning. Additionally, the outer wheels traverse paths of longer average radius and length than the inner wheels. For example, when a car is steered into a 90-degree turn to the right and the inner wheel turns on a 30-foot radius, the inner wheel travels about 46 feet. The outer wheel, being on average nearly 5 feet from the inner wheel, travels nearly 58 feet. Hence, the outer wheel must rotate more rapidly during a turn. Without some means for allowing the drive wheels to rotate at different speeds, the wheels would skid when the car was turning. This would result in little control during turns and in excessive tire wear.

Furthermore, until a wheel skid occurs due to the common drive between the front and rear drive lines, the drive shafts will wind in opposite directions until a force produced by the stored (wind-up) torque in the drive's shaft exceeds the frictional forces acting on the tires, the tires momentarily lose frictional contact, the drive lines unwind and the vehicle hops. Such operating conditions are both unacceptable to design engineers and unsettling to drivers. Installing a conventional differential assembly between the two drive lines such that they are capable of rotation at slightly different speeds solved the wind-up problem.

In some applications, a bevel gear differential, which evenly splits the torque between the drive axles, is used in the transfer case to drive the front and rear axles at all times, while allowing relative rotation between the axles to accommodate steering geometry. The use of a gear differential in a drive train has at least one drawback. That is, if any road wheel of the vehicle is on a low traction surface, the various axle and transfer case differentials allow that wheel to turn freely. As such, little power or torque is delivered to the remaining wheels.

To minimize wheel slippage, the transfer case differential is sometimes equipped with a manually operated lock-up mechanism. Such a mechanism is operated in either a locked or unlocked condition. When locked, such a mechanism connects the front and rear drive shafts together and positively drives them both at the same rotational speed. Such a locking mechanism does not allow any differentiation between front and rear drive axle turning speeds, thus leading to the previously noted problems.

Several systems have been devised to shift torque between the front and rear wheels. With such systems the clutch is aligned coaxially and serially in a linear torque path with other components of the system. A serious drawback of such designs is that there is an limit on the torque bias capability because of packaging constraints on the size of the clutch plates. In a typical vehicle there are axial packaging constraints from the engine mount, packaging constraints from the steering rack and diametrical packaging constraints from a front cross member and the engine oil pan. Thus, a need remains for a system wherein torque between front and rear drives may be shifted while taking full advantage of the packaging constraints in the vehicle.

Conventionally, a power transmission system capable of shifting torque is disclosed in U.S. Pat. No. 5,017,183, in which a differential gear mechanism coupled between two output shafts uses a planetary gear mechanism. U.S. Pat. No. 4,989,686 discloses a control system for a full time four-wheel drive having a transfer case including a planetary gear differential and an electromagnetically actuated clutch assembly for biasing torque between the front and rear drive wheels in response to signals for the control system. U.S. Pat. No. 4,718,303 discloses a four-wheel drive transfer case having a three element planetary gear differential connected to the output shaft of a transmission and having two output shafts which are driven by the differential in a predetermined timed relationship.

BRIEF SUMMARY OF THE INVENTION

A power takeoff unit with torque bias capable center differential construction for four-wheel drive applications has been invented which overcomes many of the foregoing problems. In one aspect, the invention is a power takeoff unit for a four-wheel drive vehicle including a planetary gear arrangement for a planetary center differential having an axis of rotation. The planetary gear arrangement is connectable to an output shaft of a transmission. The gear arrangement includes a cage and at least three nested gear components for operably interconnecting the output shaft with both a front and rear wheel drive output shaft for full time drive to both output shafts. Input torque to the power takeoff unit is normally biased to both output shafts in a predetermined ratio. An actuatable friction clutch is aligned on the axis of rotation of the planetary gear arrangement. The clutch has an actuating mechanism and frictionally engagable members for interconnecting two of the planetary gear components in a manner such that the torque bias to the front and rear wheel drive output shafts is controlled by a torque level established between the frictionally engagable members of the clutch.

In another aspect, the invention is an automotive power takeoff unit for four-wheel drive vehicle having an electronically responsive biasing clutch that surrounds a front axle differential. The clutch is connected to a ring gear of said planetary gear arrangement and is grounded to a hollow shaft with an expanded bell to bias torque between the other two shafts and has clutch plates having an inner diameter and an outer diameter.

In yet another aspect, the invention is a method of splitting torque between the front wheels and rear wheels in a four wheel drive vehicle which includes providing an input shaft having a predetermined torque that is attached to a power takeoff unit. The power takeoff unit has a biasing clutch with a plurality of clutch plates having an inner diameter and an outer diameter. The clutch plates have splines on the inner diameter which engage the ring gear and splines on the outer diameter which engage the planetary carrier. The biasing clutch is aligned in a non-linear torque path on said axis of rotation. The method further includes the step of activating and deactivating the biasing clutch to distribute a predetermined torque split to the front and rear wheels.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PREFERRED EMBODIMENTS

Figure 1:
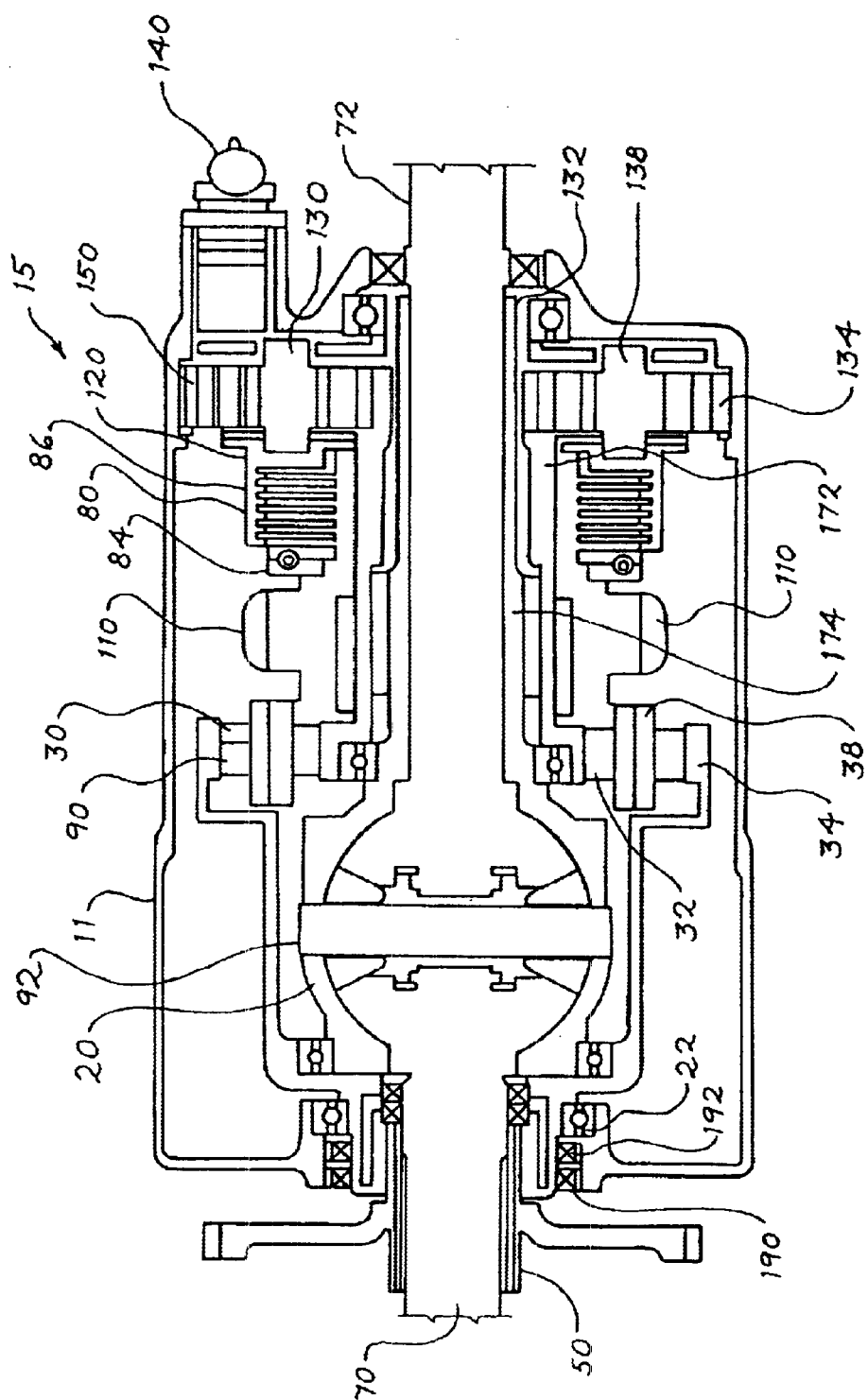
FIG. 1 is a cross-sectional view of a first embodiment of a power takeoff unit as assembled in a four-wheel drive transmission of the present invention.

Referring now to the drawings wherein like reference numerals indicate like parts throughout the several views, in FIG. 1 there is illustrated an embodiment of a power takeoff unit ("PTU") with torque bias capable center differential construction 15 of the present invention. The PTU allows power transmission between the front and rear axles. The PTU incorporates a torque transfer gear set that enables power to be directed toward the rear of the vehicle.

In the present embodiment, the front axle differential 20 is placed on the PTU 15. In a conventional front-engine drive train with a transaxle, the front axle differential 20 is located in the transaxle. The components of the PTU 15 are housed in a separate fluid-containing casing or housing 11 and comprise generally a center differential 90, a rotatably mounted input drive shaft 50, two rotary mounted power output shafts 70, 72 and operative means in the form of a clutch assembly 80. The present invention can be used with either mechanical or electrically actuated clutch mechanisms. In the embodiment illustrated in FIGS. 1,3 and 4, a ball ramp actuation mechanism 84 is preferably used. In the preferred embodiment, the center differential unit 90 includes a planetary gear set 30.

Figure 6:
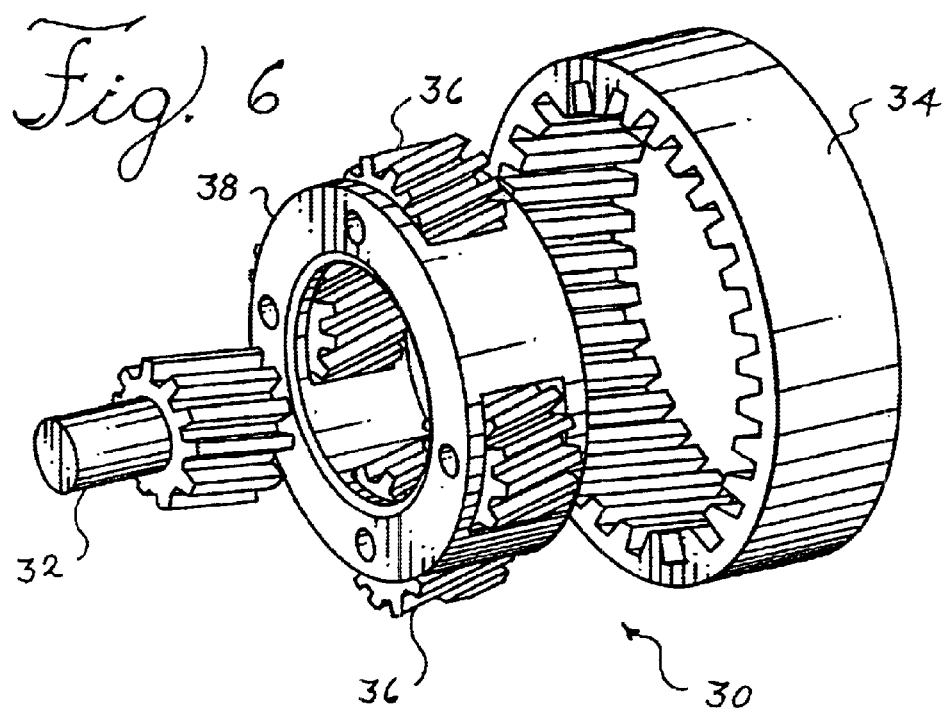
FIG. 6 is a perspective view of a planetary gear set used in the power takeoff unit of FIGS. 1, 3 and 4.
Figure 7:
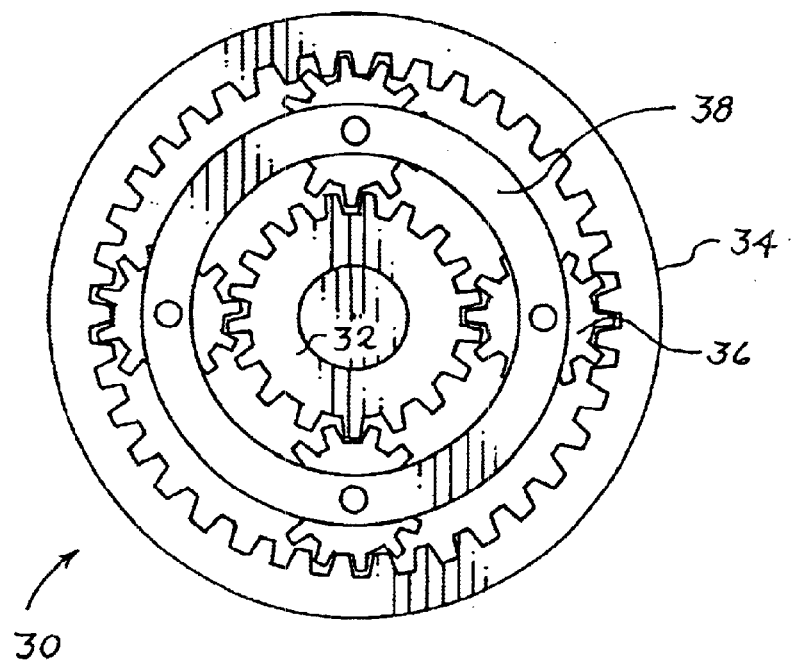
FIG. 7 is a cross-sectional view of the planetary gear set shown in FIG. 6.

As illustrated in FIGS. 6 and 7, the presently preferred planetary gear set 30 of planetary center differential 90 includes three nested and relatively rotatable elements; namely, a externally toothed sun gear 32, an internally toothed annulus or ring gear 34, and planet gears 36 which intermesh with the sun gear 32 and the ring gears 34 respectively. The planet gears 36 are carried by a planetary carrier 38.

In the preferred embodiment, the sun gear 32 rotates about an axis of rotation thereof and is connected to a final drive sun gear 132 of planetary final drive 150 by a hollow shaft 172. The ring gear 34 is preferably rotatable about an axis of rotation substantially coaxial with the axis of rotation of the sun gear 32 and is connected to a hollow shaft with an expanded bell 22. Input drive shaft 50 preferably has a splined interface 52 that turns a hollow shaft with an expanded bell 22 via bearings 190 and 192. The planet carrier 38 of the differential 90 turns about the axis of rotation of the sun gear 32 and is operably connected to a rear drive transfer mechanism that transfers torque to the rear. The rear drive transfer mechanism is preferably a rear drive sprocket 110. Other rear drive transfer mechanisms such as a chain or belt may also be used, and is known by those of ordinary skill in the art. By this construction, rotary motion of any one planetary gear normally effects rotary motion of the other two gears.

The planetary final drive 150 receives torque from hollow shaft 172. Planetary final drive 150 provides gear reduction for the front wheels. Final drive sun gear 132 and final drive planetary carrier 138 spin, while final drive ring gear 134 remains stationary. The final drive planetary carrier is splined to an inner hollow shaft 174 which is attached to the front axle differential 20. Front axle differential provides torque to left hand and right hand output shafts 70, 72.

As illustrated in FIG. 1, torque is delivered from the transmission through the input shaft 50. The left-hand front half shaft stem 70 is an output drive shaft for a front wheel. The second output shaft 72 or right-hand front half shaft is connected to a front axle differential unit 20 which is housed in a front differential case 22 and is connected with another front wheel to deliver tractive torque. The front axle differential unit 20 is operably connected to drive the front wheels through output shafts 70 and 72. The front axle differential unit 20 permits or allows the front wheels to rotate at different speeds and allows rotational speed difference between the wheels.

A speed sensor 140 measures the speed of the carrier 138, thereby measuring the front wheel speed. If the speed is nearly uniform on the front and rear axles, the center differential splits the torque at a predetermined front to rear bias ratio and the biasing clutch is not activated. That is, a predetermined percentage of the torque coming from the transmission is sent to the front wheels and a predetermined percentage is sent to the rear wheels. The center differential 90 and biasing clutch 80 control the torque split. When the biasing clutch is activated, the torque is split at a different predetermined front to rear bias ratio. Preferably, forty percent of the torque coming from the transmission is sent to the front wheels and sixty percent is sent to the rear wheels when the biasing clutch is activated. When the biasing clutch is not activated there is preferably a 50/50 torque split between the front and rear wheels.

A unique feature of the PTU 15 illustrated in FIG. 1 is that the planetary final drive 150 is placed inside the PTU housing 11 and torque is delivered to the final drive after it has passed through the center planetary differential 90 and the bias clutch 80. The planetary final drive 150 multiplies the torque that is delivered to the front wheels. The planetary final drive 150 has a planetary gear set 130 that comprises a sun gear 132, a ring gear 134 and a front drive carrier 138. In a conventional assembly, the planetary final drive 150 is placed outside the PTU and the torque from the transmission is first multiplied through the final planetary drive before the torque is delivered to the PTU. Therefore, in a conventional assembly, the PTU components must handle greater torque than the PTU components of the present invention. As a result, the components of the present PTU may be made smaller than in a conventional PTU.

Figure 2:
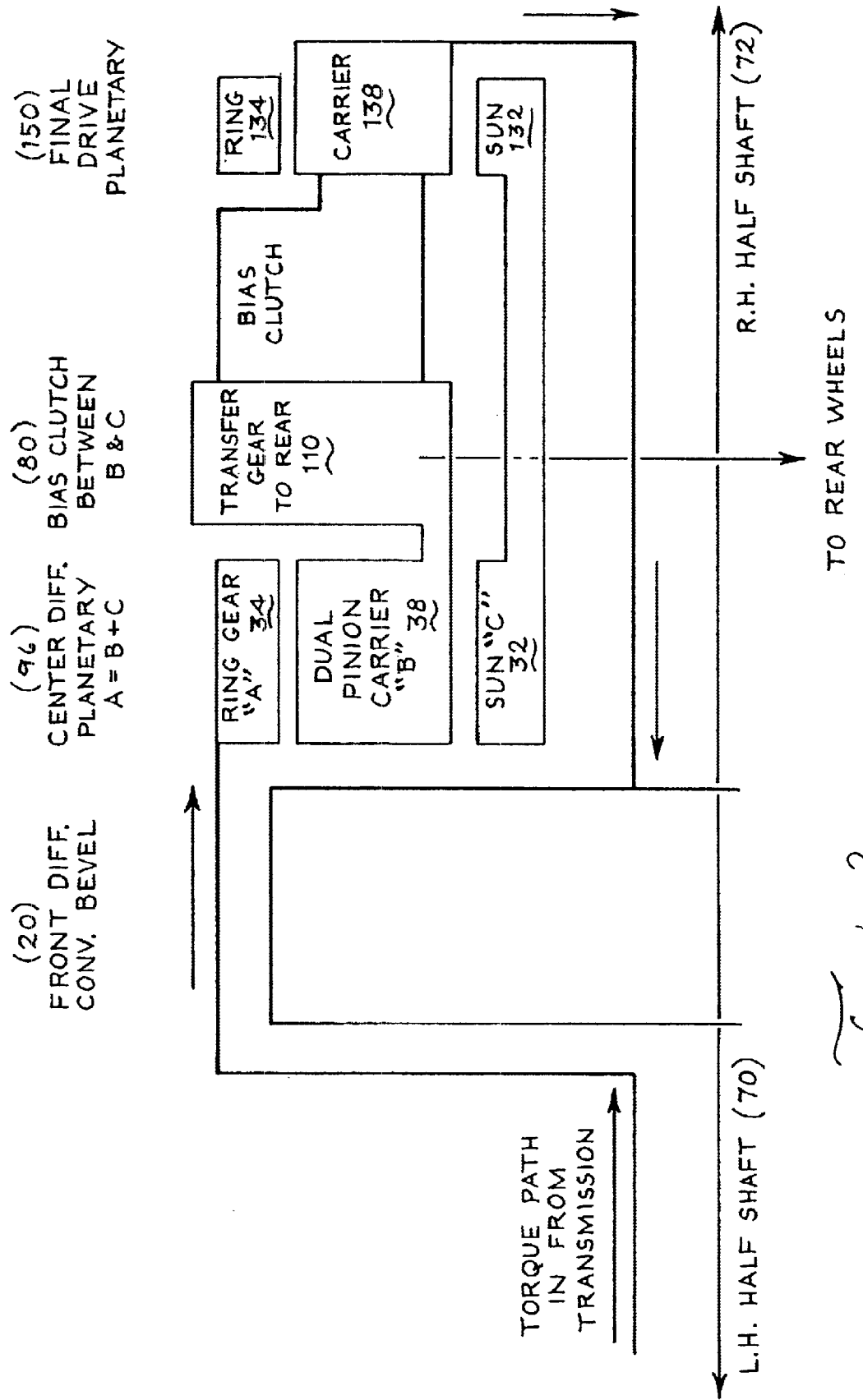
FIG. 2 is a plot illustrating the torque flow in the power takeoff unit of FIG. 1.

FIG. 2 illustrates the torque path of the PTU of FIG. 1. The torque is delivered from the transmission via input shaft 50 which turns the front differential casing 22 as described earlier. The torque then passes through the planetary center differential 90, where it first goes through the ring gear 34 and is then split to the carrier 38 and the sun gear 32. The torque from the carrier 38 passes through the rear sprocket transfer gear 110 which sends the torque to the rear wheels. The torque from the sun gear 32 is multiplied through the final drive 150 and exits through carrier 138. Carrier 138 is attached to hollow shaft 174 which is connected to front drive torque shaft 92 in front axle differential 20 which drives output shafts 70 and 72 to deliver torque to the front wheels. The torque is split such that the torque value ("A") entering the ring gear 34 equals the sum of the rear torque value ("B") to the carrier 38 and the front torque value ("C") to the sun gear 32. The clutch 80 biases the torque values B and C. In the embodiment illustrated in FIGS. 1 and 2, the clutch 80 biases the torque by restraining the torque sent to the front by slowing down the relative rotation of front differential final drive carrier 138 of planetary final drive 150.

Figure 3:
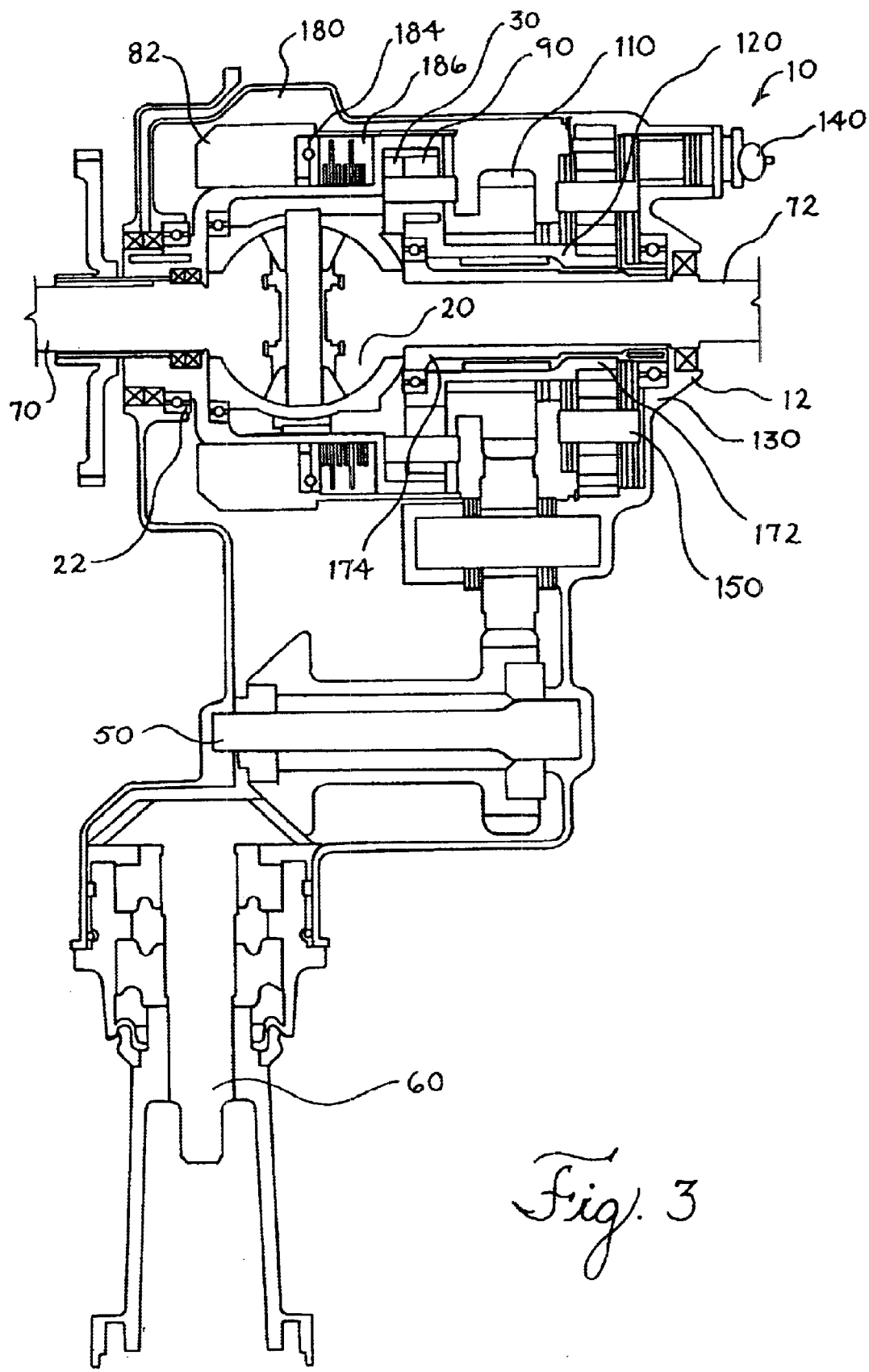
FIG. 3 is a cross-sectional view showing another embodiment of the power takeoff unit as assembled in a four-wheel drive transmission of the present invention.
Figure 4:
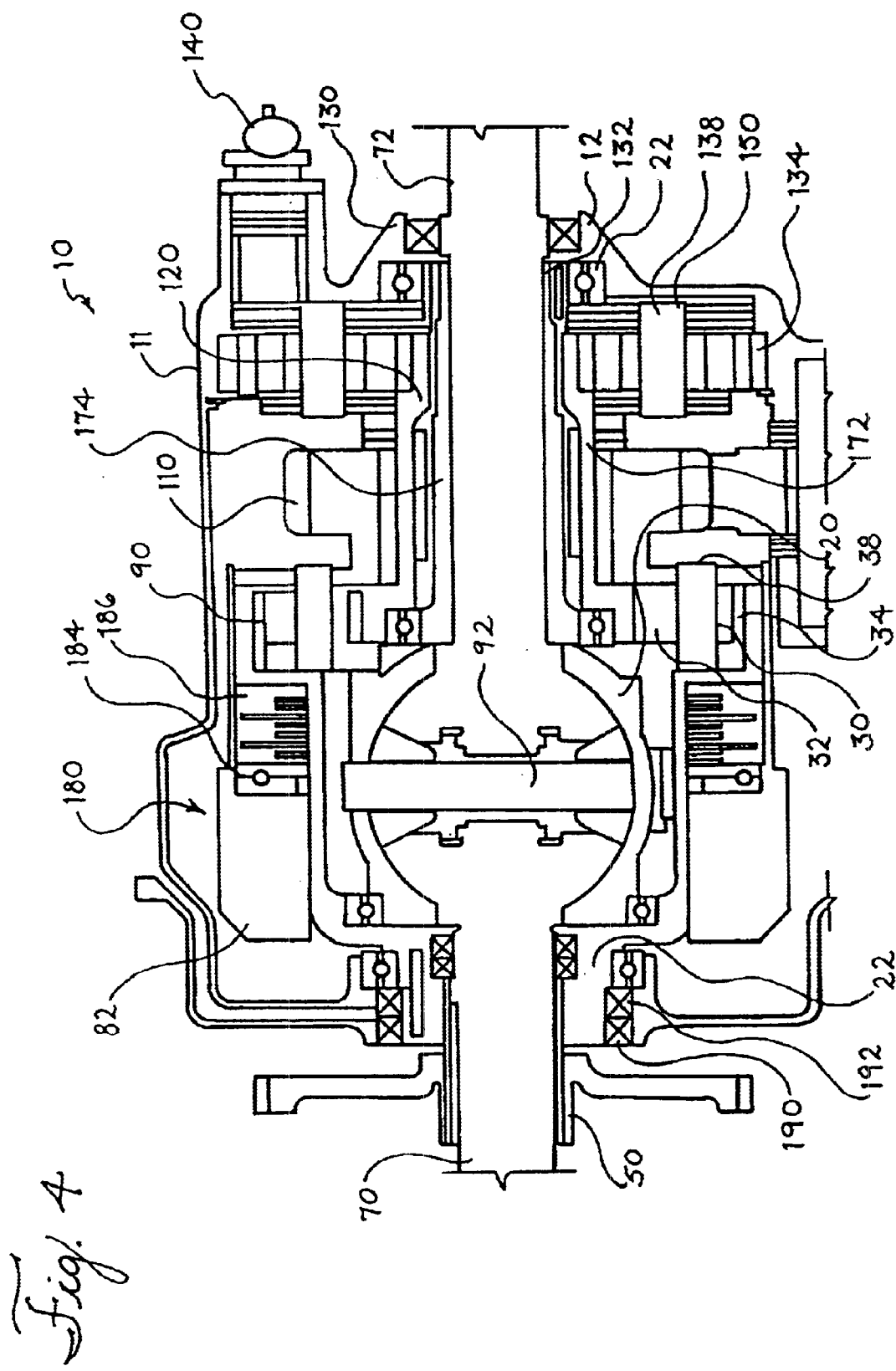
FIG. 4 is a cross-sectional view of the power takeoff unit of FIG. 3.

FIGS. 3 and 4 illustrate another embodiment of the power takeoff unit 10 of the present invention. As mentioned above, the power takeoff unit 10 further includes a biasing clutch assembly 180 for modulating torque transfer through the planetary center differential 90. That is, the biasing clutch assembly 180 conditionally and operationally adds or subtracts torque delivered to front wheels and rear wheels. In the preferred embodiment, as illustrated in FIGS. 3 and 4, the biasing clutch 180 surrounds the front axle differential 20.

In an alternate embodiment, the clutch 80 is aligned axially following a linear torque path with the other components of the differential 90 as illustrated in FIGS. 1 and 2. The clutch 80 is aligned so that it placed on the same axis of rotation as the planetary gears 30 and is preferably positioned between the rear drive sprocket 110 and the planetary final drive 150.

In the embodiment illustrated in FIGS. 3 and 4, the clutch 180 is aligned on the same axis of rotation as planetary gears 30, but takes advantage of additional radial space. Therefore, in the present embodiment the clutch 180 is preferably moved to the front and surrounds the front axle differential 20. This allows the unit of the present embodiment to be made in a smaller size case versus the PTU unit illustrated in FIG. 1 and thereby takes advantage of the space within the packaging constraints present in an automobile.

The clutch 180 has frictionally engageable members such as clutch pates that have an inner diameter and an outer diameter. The clutch 180 spans the center differential 90. The outer diameter splines of the planetary ring gear are attached to the inner diameter of the clutch plates. The inner diameter splines of the planetary carrier are attached to the outer diameter of the clutch plates (not shown). An actuator retention plate 82 is mounted on the planetary ring gear 34 and retains the force applied to the clutch pack 86 from an actuation mechanism. In the embodiment illustrated in FIGS. 3 and 4, the clutch 180 biases torque by restraining the torque sent to the rear wheels. The clutch 180 decreases the torque sent to the carrier 38 of planetary center differential 90.

Figure 5:
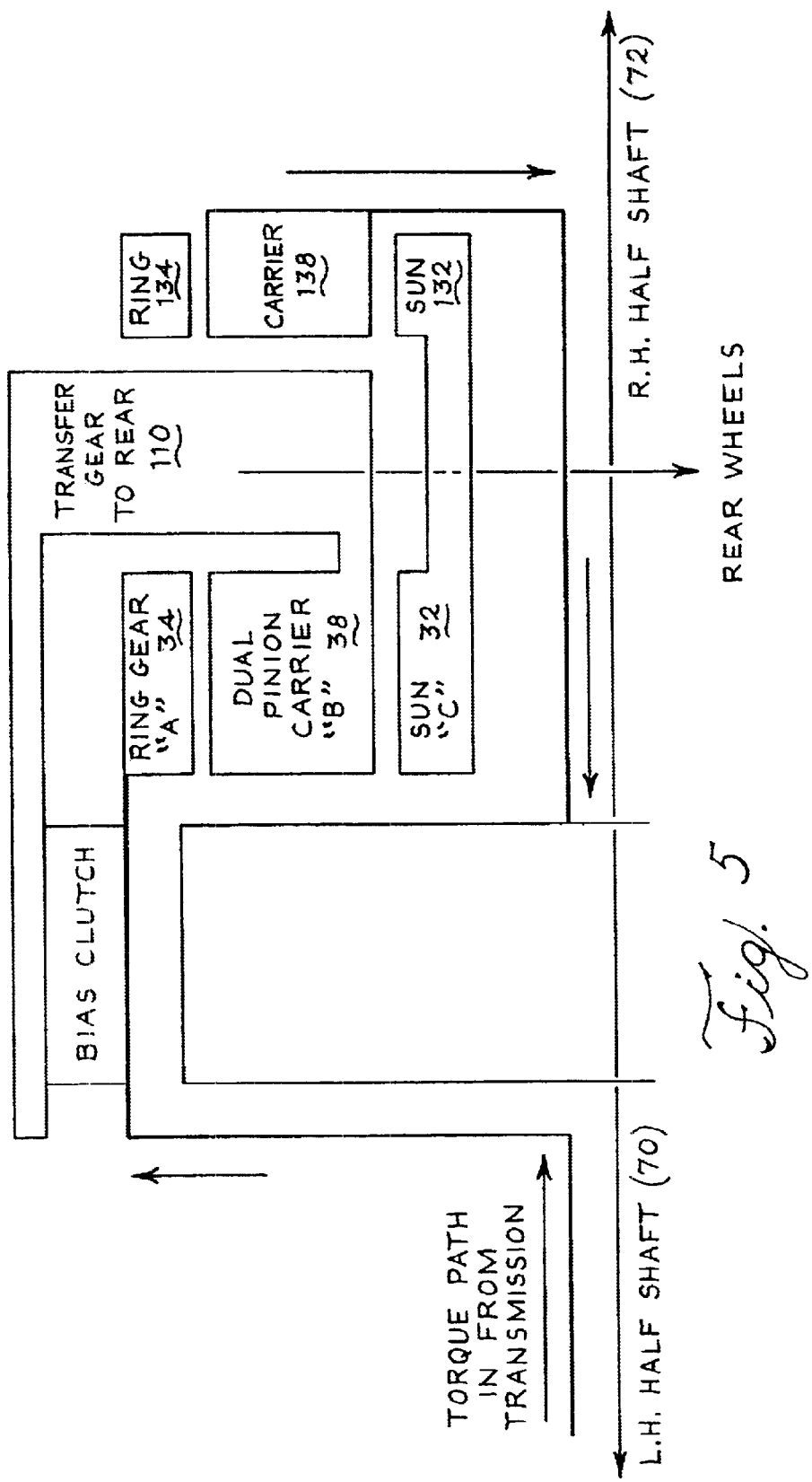
FIG. 5 is a plot illustrating the torque flow in the power takeoff unit of FIG. 4.

As illustrated in FIG. 4, the torque is delivered from the transmission through a transmission output shaft 60 to input shaft 50. Input drive shaft 50 preferably has a splined interface 52 that turns the hollow shaft with an expanded bell 22 via bearings 190 and 192. As illustrated in FIG. 5, the torque then passes through the center differential 90, where it first goes through the ring gear 34 and is then split to the carrier 38 and the sun gear 32. The torque is split such that the torque value ("A") entering the ring gear equals the sum of the torque value ("B") to the carrier and the torque value ("C") to the sun gear. The clutch 180 biases the torque values A and B. The torque from the carrier 38 passes through the rear sprocket transfer gear 110 which sends torque to the rear wheels. The torque from the sun gear 32 is multiplied through the final drive 150 and exits through sun gear 132. Sun gear 132 is attached to front drive torque shaft 92 in front axle differential 20 which drives output shafts 70 and 72 to deliver torque to the front wheels.

The present system is designed for an active full-time all-wheel drive system. An active full-time system delivers torque to the axle with traction whenever wheel slippage is detected by activating the biasing clutch. These systems can be either mechanically or electrically activated and do not require any action from the driver.

Figure 8A:
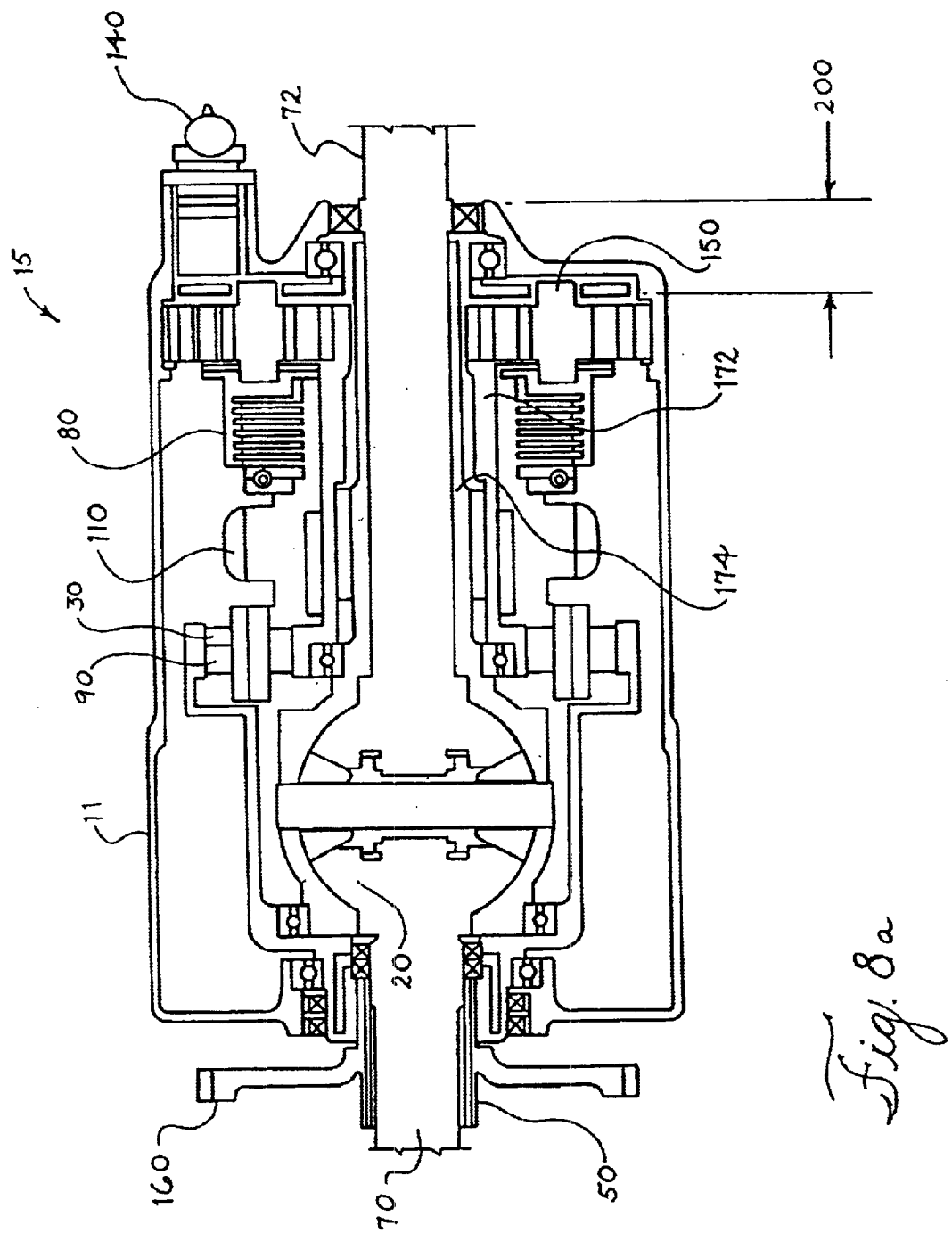
FIG. 8a is a cross-sectional view of the power takeoff unit of FIG. 1.
Figure 8B:
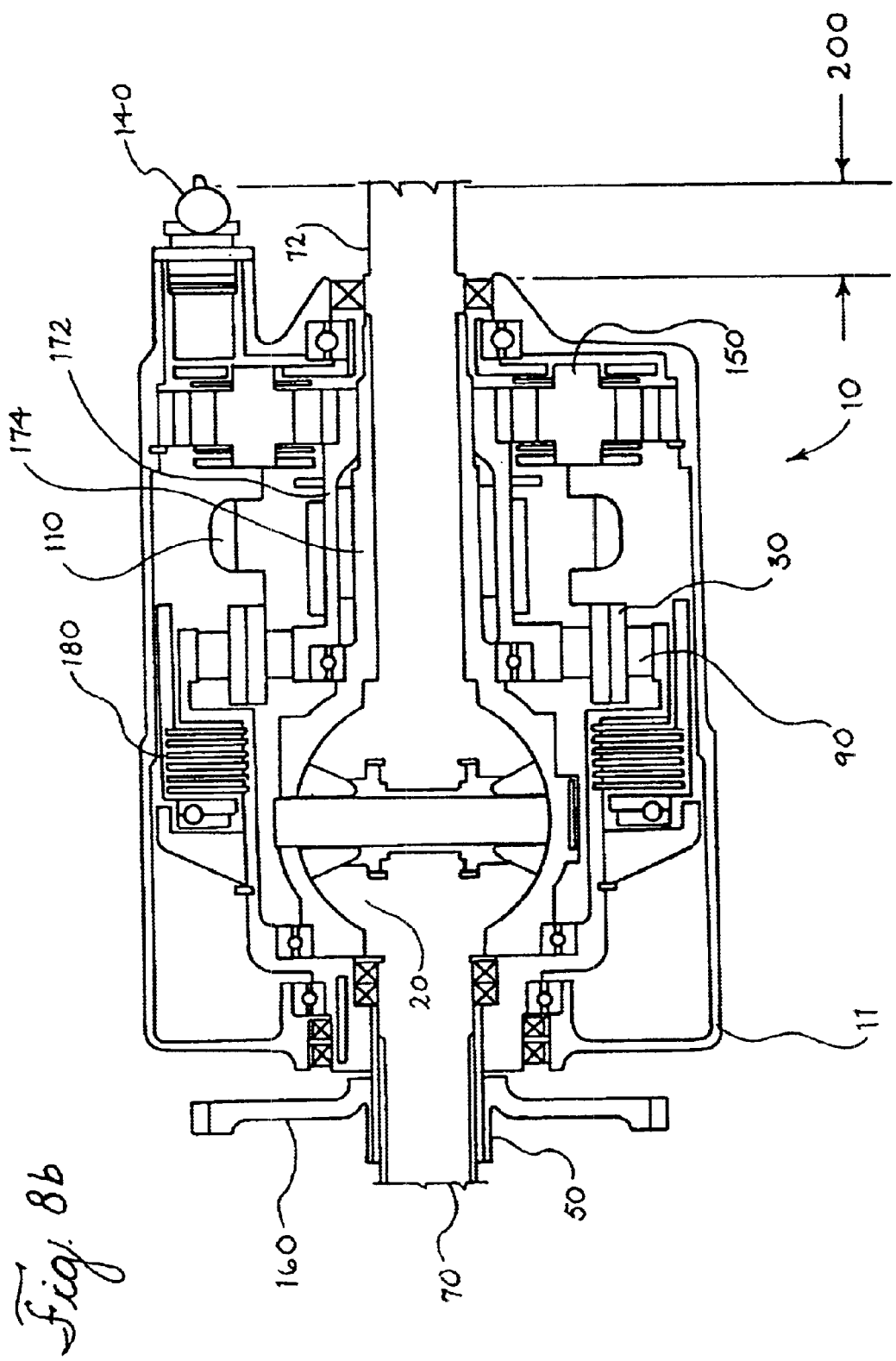
FIG. 8b is a cross-sectional view of the power takeoff unit of FIG. 4 of the present invention.

FIGS. 8a and 8b illustrates a comparison of the two embodiments of the PTU of the present invention that have been disclosed in the present invention. By positioning the biasing clutch means 180 in the position shown in FIG. 8b, front to rear torque bias may be provided with minimal axial packaging. Since the design packages the front axle differential 20 inside the transfer case, the clutch plates may be made larger in diameter to allow greater torque bias capability. Due to torque flow, the layout of the present invention takes advantage of the low torque in the center differential and across the bias clutch 180 to optimize the effectiveness of the bias clutch and provides the ability to use smaller center differential components. Positioning the clutch around the front axle differential also allows the capability of designing a smaller PTU thereby providing more axial space 200 for other components.

From the above it will be understood that this invention provides a power takeoff unit with center bias capability which modulates torque transfer to the front and rear wheel drive output shafts of a vehicle through a unique power takeoff unit. With the present invention, all four wheels may continually receive motive force while concurrently controlling torque level of each wheel.

While the invention has been described in connection with a specific embodiment thereof, it is evident that many alternatives, modifications and variations will be apparent to those skilled in the art in light of the foregoing description. Accordingly, it is intended that the invention includes all such alternatives, modifications, and variations as fall within the spirit and broad scope of the appended claims.

We claim:

1. A power takeoff unit for a four-wheel drive vehicle, comprising:
   a planetary center differential having an axis of rotation operably connected to an input shaft, said center differential including at least three nested gear components for operably interconnecting said input shaft with both a planetary final drive and a rear drive transfer mechanism such that input torque to said power takeoff unit is split to the planetary final drive and the rear drive transfer mechanism in a predetermined ratio; and
   a biasing clutch aligned on said axis of rotation, said biasing clutch having an actuation mechanism and frictionally engagable members, wherein one of said frictionally engagable members is connected to at least one of said nested gear components of said planetary center differential or a front differential final drive carrier of the planetary final drive in a manner such that the torque split is controlled by a torque level established between the frictionally engagable members of said biasing clutch.

2. The power takeoff unit of claim 1 wherein said three nested gear components of said planetary center differential include a sun gear, a ring gear, and a plurality of planet gears on a planetary carrier intermeshing with said sun gear and said ring gear.

3. The power takeoff unit of claim 2 wherein said frictionally engageable members comprise clutch plates having an outer diameter and an inner diameter.

4. The power takeoff unit of claim 3 wherein the ring gear has splines on its outer diameter that attach to said inner diameter of said clutch plates.

5. The power takeoff unit of claim 3 wherein said planetary carrier has splines on its inner diameter that attach to said outer diameter of said clutch plates.

6. The power takeoff unit of claim 1, wherein said biasing clutch surrounds a front axle differential.

7. The power takeoff unit of claim 1 wherein said biasing clutch is positioned between the rear drive transfer mechanism and the planetary final drive.

8. The power takeoff unit of claim 1 wherein said biasing clutch controls the relative rotation of said front differential final drive carrier of said planetary final drive.

9. The power takeoff unit of claim 1 wherein said biasing clutch allows variable biasing between a fully actuated position and an unactuated position.

10. An automotive power takeoff unit for four-wheel drive comprising:
    a power takeoff unit housing;
    a planetary center differential comprising at least three elements arranged within said power takeoff unit housing, said three elements including a ring gear element operably connectable with a rotary input shaft, a sun gear element operably connectable with a planetary final drive and a planet gear element assembly intermeshing with both the sun and ring gear elements and which is operably connectable with a rear drive transfer mechanism such that input torque to the power takeoff unit is split to the planetary final drive and the rear drive transfer mechanism in a predetermined ratio; and
    a responsive biasing clutch surrounds a front axle differential and is connected to at least one of said three elements of said planetary center differential to bias torque between the planetary final drive and the rear drive transfer mechanism.

11. The power takeoff unit of claim 10 wherein the biasing clutch controls the relative rotational speed of the planet gear assembly of the planetary center differential.

12. The power takeoff unit of claim 10 wherein said planet gear assembly is connected to said biasing clutch.

13. The power takeoff unit of claim 10 wherein the biasing clutch generates a clutch force by mechanical actuation, electronic actuation or hydraulic actuation.

14. The power takeoff unit of claim 10 wherein the planetary final drive is inside said power takeoff unit housing.

15. The power takeoff unit of claim 10 further comprising a front axle differential operably connectable with said planetary final drive.

16. The power takeoff unit of claim 15 wherein said front axle differential is inside said power takeoff unit housing.

17. The power takeoff unit of claim 10 wherein said clutch is aligned on an axis of rotation of said planetary center differential.

18. The power takeoff unit of claim 10 wherein said front axle differential delivers torque to a front axle and the rear drive transfer mechanism delivers torque to a rear axle.

19. The power takeoff unit of claim 18 wherein there is a predetermined torque split between the front axle and the rear axle when said biasing clutch is actuated.

20. The power takeoff unit of claim 10 wherein said predetermined torque split is dictated by center differential component ratios.

21. The power takeoff unit of claim 10, wherein the planetary final drive multiplies the torque sent to a front axle.

22. An automotive power takeoff unit for four-wheel drive comprising:
    a power takeoff unit housing;
    a planetary center differential having at least three elements arranged within said power takeoff unit housing, said three elements including a sun gear operably connectable with a final drive sun gear of a planetary final drive, a ring gear element operably connectable with said input shaft, and a planet gear element assembly intermeshing with both the sun and ring gear elements and which is operably connectable with a rear drive transfer mechanism, wherein said planetary final drive is inside said power takeoff unit housing and is operably connectable with a front axle center differential such that input torque to the power takeoff unit is split between the planetary final drive and the rear drive transfer mechanism in a predetermined ratio; and
    a responsive biasing clutch positioned between the rear drive transfer mechanism and the planetary final drive, wherein said biasing clutch is connected to a final drive carrier of said planetary final drive to bias torque between the planetary final drive and the rear drive transfer mechanism.

23. A method of splitting torque between the front wheels and rear wheels in a four wheel drive vehicle comprising:
    a. providing an input shaft having a predetermined torque that is attached to a power takeoff unit, said power takeoff unit comprising:
        i. a planetary center differential having an axis of rotation operably connected to said input shaft, said center differential including at least three nested gear components for operably interconnecting said input shaft with both a planetary final drive and a rear drive transfer mechanism such that input torque to said power takeoff unit is split to the planetary final drive and the rear drive transfer mechanism in a predetermined ratio; and ii. a biasing clutch aligned on said axis of rotation, said biasing clutch having an actuation mechanism and frictionally engagable members, wherein one of said frictionally engagable members is connected to at least one of said nested gear components of said planetary center differential or a front differential final drive carrier of the planetary final drive in a manner such that the torque split is controlled by a torque level established between the frictionally engagable members of said biasing clutch.

b. actuating said biasing clutch to distribute a predetermined torque split to the front and rear wheels.

* * * * *